Feb. 12, 1952 J. F. BROWN 2,585,085
HITCH FOR TRACTOR-DRAWN PLOWS
Filed Feb. 4, 1949 4 Sheets-Sheet 1
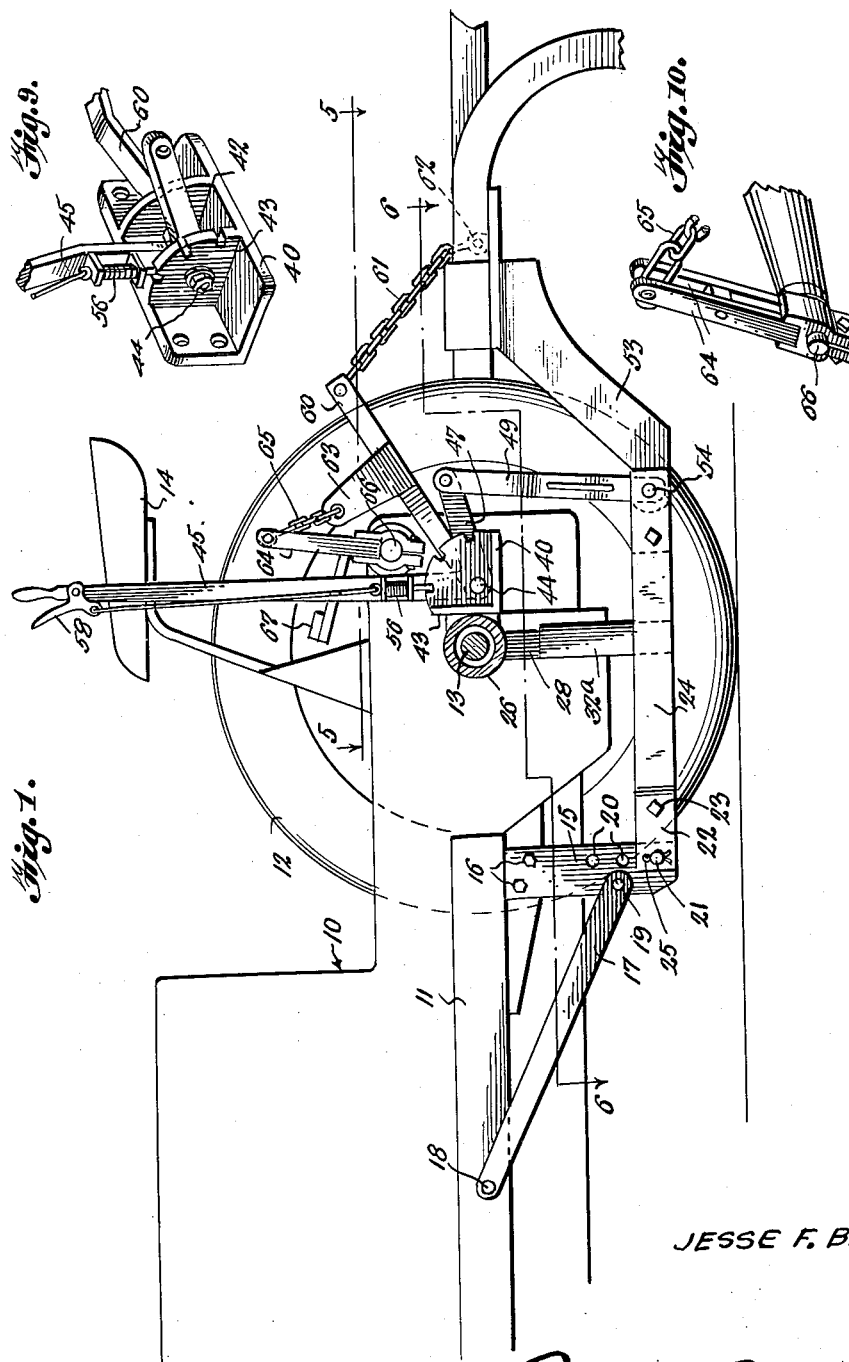
Inventor
JESSE F. BROWN
By Patrick D. Beavers
Attorney Feb. 12, 1952        J. F. BROWN        2,585,085
HITCH FOR TRACTOR-DRAWN PLOWS
Filed Feb. 4, 1949        4 Sheets—Sheet 2
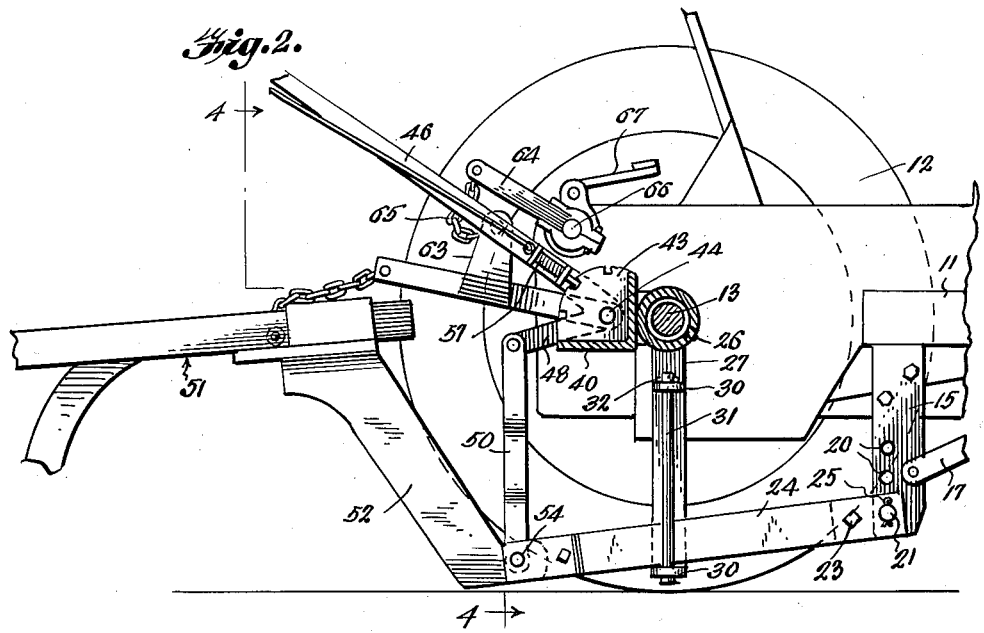
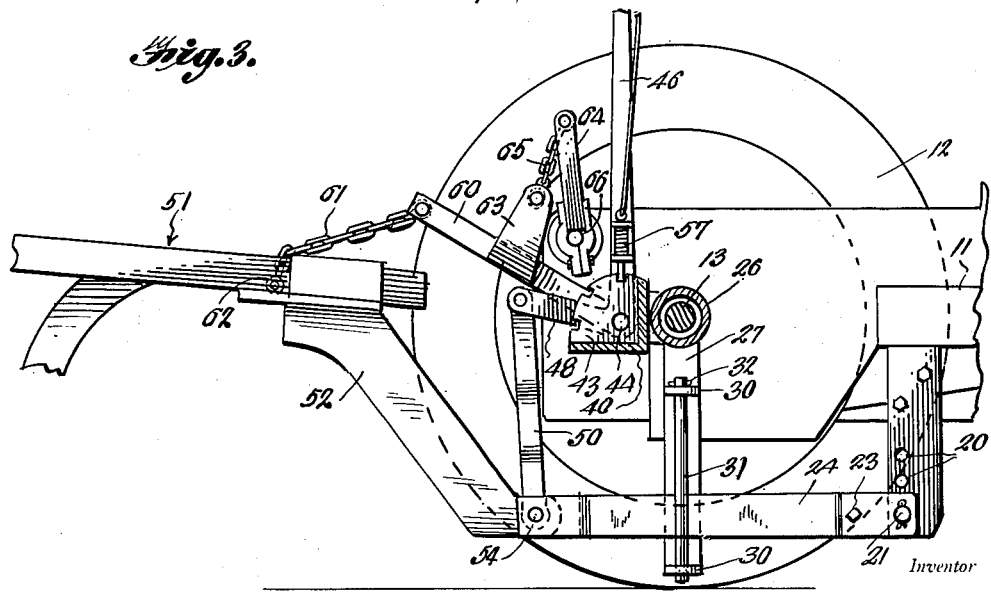
Inventor
JESSE F. BROWN
By Patrick D. Beavers
Attorney

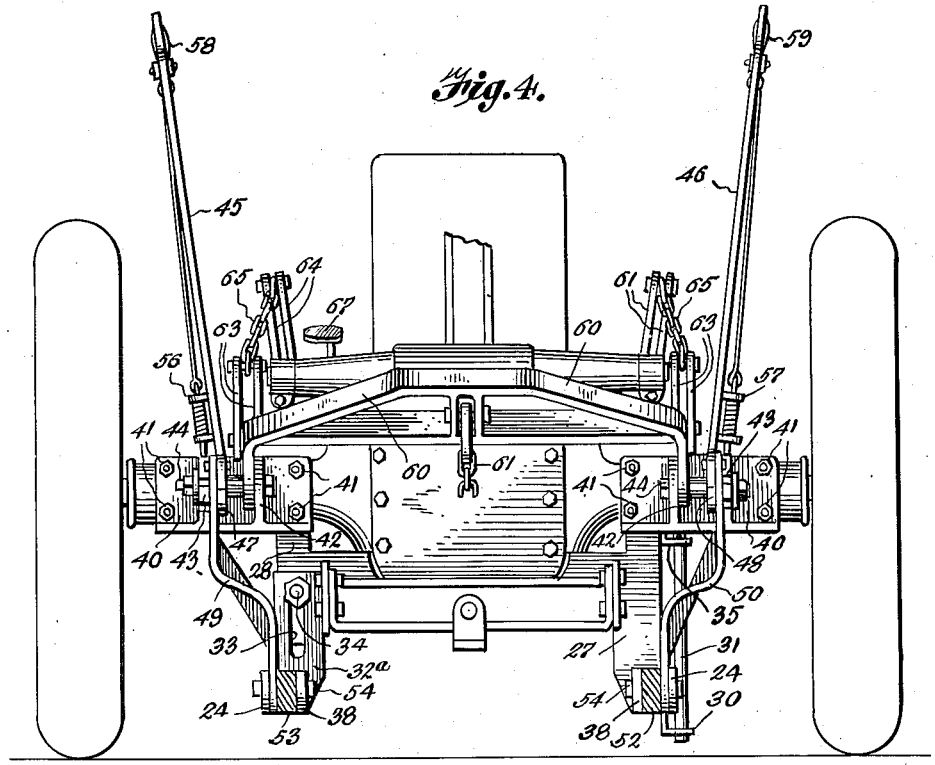
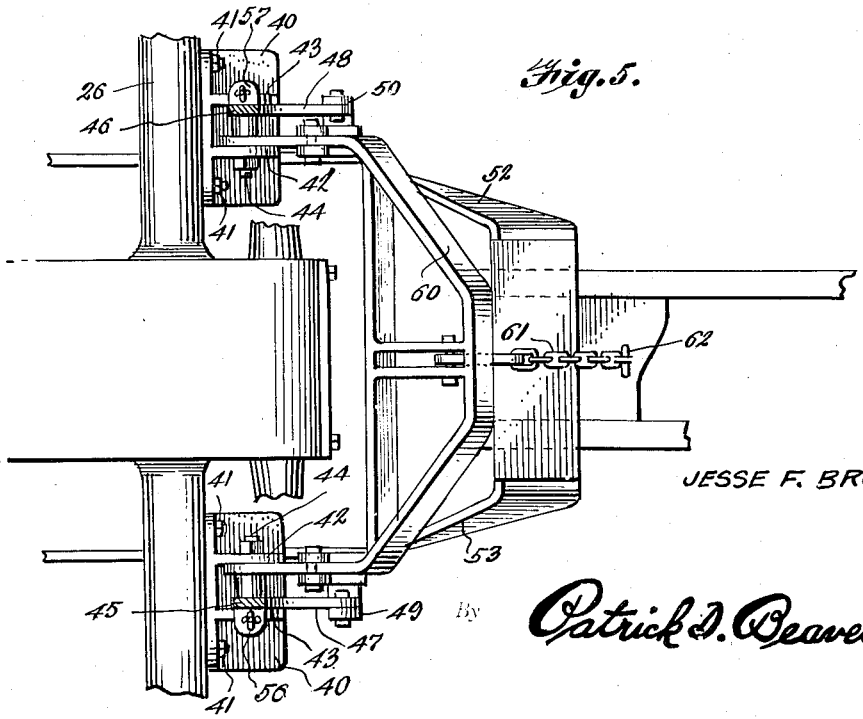

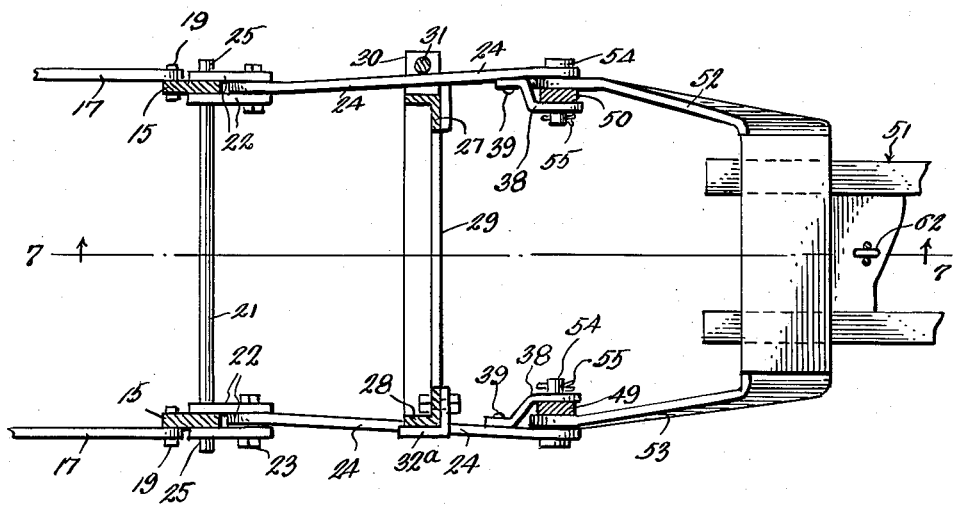
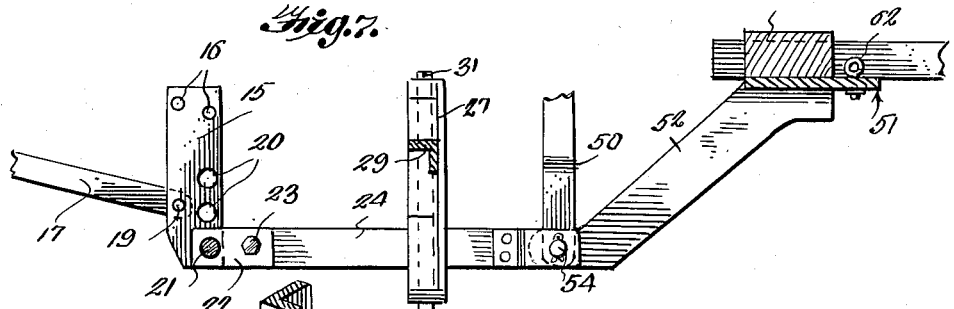
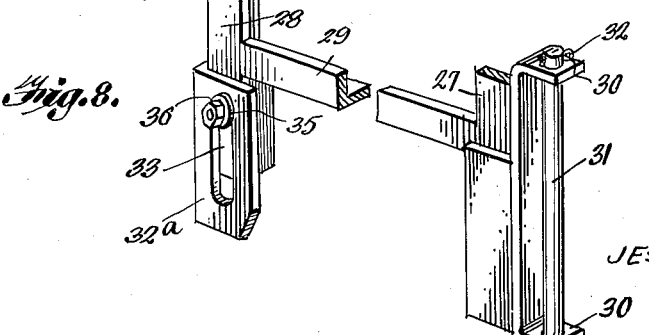
Inventor
JESSE F. BROWN
By Patrick D. Beavers
Attorney Patented Feb. 12, 1952

2,585,085

UNITED STATES PATENT OFFICE 2,585,085

HITCH FOR TRACTOR-DRAWN PLOWS

Jesse F. Brown, Lebanon, Tenn.

Application February 4, 1949, Serial No. 74,591

1 Claim. (Cl. 97—50)

The present invention relates to a hitch for tractor drawn plows and it consists in the combinations, constructions and arrangements of parts herein described and claimed.

Generally there is provided a hitch for interconnecting a tractor-drawn plow with its tractor and means is provided for controlling the depth of the plows in the ground and also for controlling the position of the plows laterally with respect to the longitudinal axis of the tractor. Levers are placed conveniently to the operator of the tractor for effecting these means.

It is accordingly an object of the invention to provide an apparatus of the character set forth which is simple in construction and operation and yet effective and efficient in use.

Another object of the invention is the provision of an apparatus of the character set forth wherein means is provided for regulating the position of a tractor-drawn plow with respect to the longitudinal axis of the tractor and wherein separate independent means is provided for regulating the depth of the plow in the ground.

Another object of the invention is the provision of an apparatus of the character set forth which may be easily and quickly mounted upon or dismounted from a tractor.

Other and further objects of the invention will become apparent from a reading of the following specification taken in conjunction with the drawings, in which:

Figure 1 is a side elevational view of an embodiment of the invention,

Figure 2 is a side elevational view taken from the right side of the apparatus and showing certain parts thereof in lowered position, Figure 3 is a view similar to Figure 2 but showing certain parts in an elevated position, Figure 4 is a sectional view taken along line 4—4 of Figure 2, Figure 5 is a sectional view taken along line 5—5 of Figure 1, Figure 6 is a sectional view taken along line 6—6 of Figure 1, Figure 7 is a sectional view taken along line 7—7 of Figure 6, and Figures 8 to 10, inclusive, are fragmentary perspective views illustrating certain details of the invention.

Referring more particularly to the drawings, there is shown therein a tractor 10 having a frame 11 and provided with rear wheels 12 mounted upon an axle 13. There is also provided a seat 14 for the operator of the tractor.

Affixed to the frame adjacent the rear end and at either side thereof is a dependant arm 15 which is attached to the frame by means of bolts 16. Each of the arms 15 is interconnected with the frame 11 by means of a brace member 17 which is attached to the frame 11 and arm 15 by means of bolts 18 and 19, respectively. The lower ends of the arms 15 are each provided with a series of vertically arranged holes 20. A transversely extending rod 21 extends through selected openings 20 in the arms 15 and through pairs of links 22 pivotally connected by means of bolts 23 to the front end of horizontally extending draw bars 24 and the outer ends of the rod 21 are provided with cotter pins 25.

To an axle housing 26 for the axle 13 there is affixed a pair of dependant stabilizer arms 27 and 28 upon the right and left sides of the tractor 10, respectively. The arms 27 and 28 are preferably and as shown formed of angle iron and are interconnected by means of a transversely extending integrally formed brace 29. The arm 27 is provided with a pair of outwardly extending ears 30 through which extends a vertically mounted pin 31 which is held in position by means of a cotter pin 32. The right hand draw bar 24 extends between the pin 31 and the arm 27.

Slidably arranged upon the arm 28 is a vertically extending guide member 32a likewise formed of angle iron and provided with a slot 33 formed in one side thereof and extending vertically therein. A bolt 34 affixed to the arm 28 extends through the slot 33 and is provided with a washer 35 and nut 36 at its outer end.

The lower end of the guide member 32a is affixed to the left hand draw bar 24. Each of the draw bars 24 is provided with a bracket 38 which is attached to the inner sides thereof by means of bolts 39 and which brackets extend rearwardly in parallel relation to the rearward extremities of the draw bar 24.

A pair of mounting plates 40 is affixed by means of bolts 41 to the rear of the axle housing and each is provided with an integrally formed ear 42 which extends vertically and rearwardly thereof. Each of the plates 40 is also provided with an integrally formed segment 43 which extends vertically and rearwardly.

The segments 43 are interconnected with their respective ears 42 by means of bolts 44 upon each of which respectively is pivotally mounted a left hand operating lever 45 and a right hand operating lever 46. The levers 45 and 46 are respectively supplied with integrally formed rearwardly extending arms 47 and 48 and to the outer ends of each of which is respectively pivotally connected a downwardly extending link 49 and a downwardly extending link 50.

A plow generally indicated at 51 is provided with a pair of downwardly and forwardly extending arms 52 and 53, the same being upon the right and left sides thereof, respectively. Removable pins 54 extend through the rear ends of the draw bars 24, the respective arms 52 and 53, the respective lower ends of the links 50 and 49 and the brackets 38 and are provided at their inner ends with cotter pins 55 to hold the same in position.

The levers 45 and 46 are provided with conventional latch members 56 and 57, respectively, operable by means of hand levers 58 and 59, respectively, and which latch members are engageable with the segments 43.

A lifting bail 60 is pivotally mounted upon the bolts 44 and its outer end is provided with a chain 61 which is attachable to an eye 62 mounted upon the upper side of the rear of the plow. The bail 60 is provided with upwardly extending ears 63 which are interconnected with levers 64 by means of chains 65 and the levers 64 are affixed to a transversely extending revoluble shaft 66 which is controlled by means of a foot pedal 67.

In operation, it will be seen that forward movement of the left hand lever 45 will cause a raising of the arm 47 and consequently a lifting of the link 49 and an upward movement of the left hand draw bar 24, the same pivoting upon the pin 21 during such movement. When such movement occurs the guide member 32a will move upwardly carrying with it the arm 53 of the plow 51 thus tilting the plow. It will be seen that the forward or rear movement of the left hand lever 45 will therefore control the angular relation of the plow blades with the level of the ground.

Again, forward movement of the right hand lever 46 will cause an upward movement of the arm 48 and consequently an upward movement of the link 50 thus raising the right hand draw bar 24 and consequently lifting the front right end of the plow 51 to thus regulate the depth of the plow blade with respect to the ground.

While but one form of the invention has been shown and described herein, it will be readily apparent to those skilled in the art that many minor modifications may be made without departing from the spirit of the invention or the scope of the appended claim.

What is claimed is:

An apparatus of the character described comprising, in combination, a tractor having a frame, a plow adapted to be drawn by said tractor, a hitch for interconnecting the plow and the tractor, means for regulating the penetrability of the plow into the ground and means for controlling the angular relation of the plow to the ground, said means for regulating the penetrability of the plow including a transversely extending power shaft carried by said tractor, a rearwardly extending yoke having its legs pivotally connected at each side of said tractor, a pair of levers affixed to said shaft, an ear extending upwardly from each leg of said yoke, a chain interconnecting each ear with one of said levers affixed to said shaft, and a chain interconnecting the bight portion of the yoke with the upper rear portion of said plow whereby to raise and lower the same, and said means for controlling the angular relation of the plow including an operating lever mounted upon each side of the tractor and linkage and levers interconnecting each of the operating levers with its respective side of the front of the plow whereby to tilt the same.

JESSE F. BROWN.

REFERENCES CITED

The following references are of record in the file of this patent:

UNITED STATES PATENTS

| Number | Name | Date |
|---|---|---|
| 1,505,201 | Johnson | Aug. 19, 1924 |
| 1,688,615 | Daniel | Oct. 23, 1928 |
| 2,167,210 | Imsick | July 25, 1939 |
| 2,302,502 | Morkoski et al. | Nov. 17, 1942 |
| 2,306,814 | Knapp | Dec. 29, 1942 |
| 2,312,616 | Altgelt | Mar. 2, 1943 |
| 2,477,994 | Love | Aug. 2, 1949 |